US006781743B2

(12) United States Patent
Furyk et al.

(10) Patent No.: US 6,781,743 B2
(45) Date of Patent: Aug. 24, 2004

(54) DRIVE CIRCUIT FOR MEMS DEVICE AND METHOD OF OPERATION THEREOF

(75) Inventors: Marek M. Furyk, Boyertown, PA (US); Khanh C. Nguyen, Whitehall Township, PA (US); Andrew P. Sabol, Oley Township, PA (US); Xiaoqing Yin, Allentown, PA (US)

(73) Assignees: Agere Systems, Inc., Allentown, PA (US); Lucent Technologies Inc., Murray Hill, NJ (US)

( * ) Notice: Subject to any disclaimer, the term of this patent is extended or adjusted under 35 U.S.C. 154(b) by 77 days.

(21) Appl. No.: 10/008,386

(22) Filed: Dec. 7, 2001

(65) Prior Publication Data

US 2004/0070812 A1 Apr. 15, 2004

(51) Int. Cl.[7] .............................................. G02B 26/00
(52) U.S. Cl. ........................................ 359/290; 359/291
(58) Field of Search .................................. 359/290, 291, 359/292, 295, 298, 223, 224

(56) References Cited

U.S. PATENT DOCUMENTS

| 5,629,790 A | * | 5/1997 | Neukermans et al. ........ 359/198 |
| 5,719,695 A | * | 2/1998 | Heimbuch .................... 359/291 |
| 5,847,859 A | * | 12/1998 | Murata ........................ 359/224 |

\* cited by examiner

Primary Examiner—Scott J. Sugarman
Assistant Examiner—Tuyen Tra

(57) ABSTRACT

A drive circuit for a MEMS device, an integrated circuit having a plurality of MEMS devices and drivers, a method of operating the drive circuit and a method of manufacturing the integrated circuit. In one embodiment, the drive circuit includes: (1) an electrode driver and (2) a switching network, coupled to an output of said electrode driver that: (a) in a first configuration, couples said output to a first electrode of an axis of said MEMS device and grounds an opposing second electrode of said axis of said MEMS device and (b) in a second configuration, couples said output to said second electrode and grounds said first electrode.

14 Claims, 4 Drawing Sheets

DRIVE CIRCUIT FOR MEMS DEVICE AND METHOD OF OPERATION THEREOF

TECHNICAL FIELD OF THE INVENTION

The present invention is directed, in general, to microelectromechanical systems (MEMS) devices and, more specifically, to a drive circuit for a MEMS device and method of operating the same to drive a MEMS device.

BACKGROUND OF THE INVENTION

Electrostatically actuated micro-electromechanical system (MEMS) devices have been proposed for a variety of applications. One promising use for MEMS devices is in optical switching and steering devices. In such devices, movable micro-machined mirrors are used as a switching element to direct an input optical signal to a desired output. The movement of the micro-machined mirrors is accomplished by electrostatic actuation.

In a typical MEMS device, an individual mirror is affixed to a movable support structure (i.e., a gimbal) via torsional elements such as springs. The gimbal may be coupled to a frame, also via torsional elements. Typically, two torsional elements positioned on opposing sides of the mirror, couple the mirror to the gimbal, and define an axis for mirror rotation. Similarly, two torsional elements positioned on opposing sides of the gimbal couple the gimbal to the frame, and define an axis for gimbal rotation.

In a typical situation, electrodes are positioned under the mirror and gimbal. The electrodes are configured to rotate the mirror or gimbal in either direction about its axis. The mirror or gimbal rotates under the electrostatic force between the mirror and gimbal, and is balanced in equilibrium by the restoring force of the torsional elements. The degree of rotation depends upon the amount of voltage applied to the electrodes. Traditionally, a degree of rotation up to about 9 degrees is achievable.

Prior-art attempts to drive the MEMS mirrors to a given degree of rotation used a digital to analog converter (DAC) and an amplifier, perhaps a high-voltage (HV) amplifier, to apply a voltage to each electrode for each axis. In order to control the mirror, a desired drive voltage was programmed into a first DAC to drive the HV amplifier, which in turn drove a first electrode of a given axis. A second DAC was programmed to zero volts, or ground, or virtual ground, and therefore a second electrode of a given axis was also driven to a zero drive voltage by the second DAC. However, the prior-art attempts required both a DAC and HV for each electrode, i.e, each axis used 2 DACs and 2 amplifiers, perhaps HV amplifiers. This plurality of components can lead to a loss of "real estate" on a chip, higher cost, undesirable thermal characteristics, and so on.

Accordingly, what is needed in the art is a drive circuit for a MEMS device and method of operating the same that overcomes the deficiencies of the prior art.

SUMMARY OF THE INVENTION

To address the above-discussed deficiencies of the prior art, the present invention provides a drive circuit for a MEMS device, an integrated circuit having a plurality of MEMS devices and drivers, a method of operating the drive circuit and a method of manufacturing the integrated circuit. In one embodiment, the drive circuit includes: (1) an electrode driver and (2) a switching network, coupled to an output of the electrode driver that: (a) in a first configuration, couples the output to a first electrode of an axis of the MEMS device and grounds an opposing second electrode of the axis of the MEMS device and (b) in a second configuration, couples the output to the second electrode and grounds the first electrode.

The present invention is based on the recognition that prior art MEMS device driver circuits employing two electrode drivers per axis essentially wasted one of the two driver circuits. While one driver circuit was performing the useful task of positioning the MEMS device, the other was producing nothing more than a ground signal to inactivate the opposing electrode. Since electrode drivers cost some amount of money to fabricate, occupy some space ("real estate"), require electricity to power and produce heat during operation, elimination of unnecessary electrode drivers is advantageous. The present invention therefore introduces a switching network that allows a single electrode driver to do the work that previously required two, and inactivates unused opposing electrodes to ground in a simpler and more direct manner.

In one embodiment of the present invention, the electrode driver includes: (1) a digital-to-analog converter and (2) an amplifier that provides the output. Those skilled in the pertinent art are familiar with the structure and function of conventional electrode drivers. The present invention can employ either conventional or later-discovered electrode drivers.

In one embodiment of the present invention, the first and second configurations are mutually exclusive. Alternatively, the first and second configurations may coexist, advantageously for only a brief period of time.

In one embodiment of the present invention, the switching network includes: (1) a first switch interposing the output and the first electrode, (2) a second switch interposing the output and the second electrode, (3) a third switch interposing the first electrode and an electrical ground and (4) a fourth switch interposing the second electrode and the electrical ground. In a more specific embodiment, the first and fourth switches operate in tandem, the second and third switches operate in tandem and the first and second switches are never simulaneously in an ON state. Of course, as stated above, the first and second switches may be simultaneously in an ON state, but advantageously for only a brief period of time.

In one embodiment of the present invention, the drive circuit further includes: (1) a second electrode driver and (2) a second switching network, coupled to an output of the second electrode driver that: (a) in a first configuration, couples the output to a third electrode of a second axis of the MEMS device and grounds an opposing fourth electrode of the second axis of the MEMS device and (b) in a second configuration, couples the output to the fourth electrode and grounds the third electrode. Therefore, the present invention can be extended to control multi-axis MEMS devices.

In one embodiment of the present invention, the electrode driver and the switching network are embodied in an integrated circuit. Those skilled in the pertinent art will understand, however, that the driver circuit of the present invention may be embodied in any appropriate conventional or later-discovered form.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
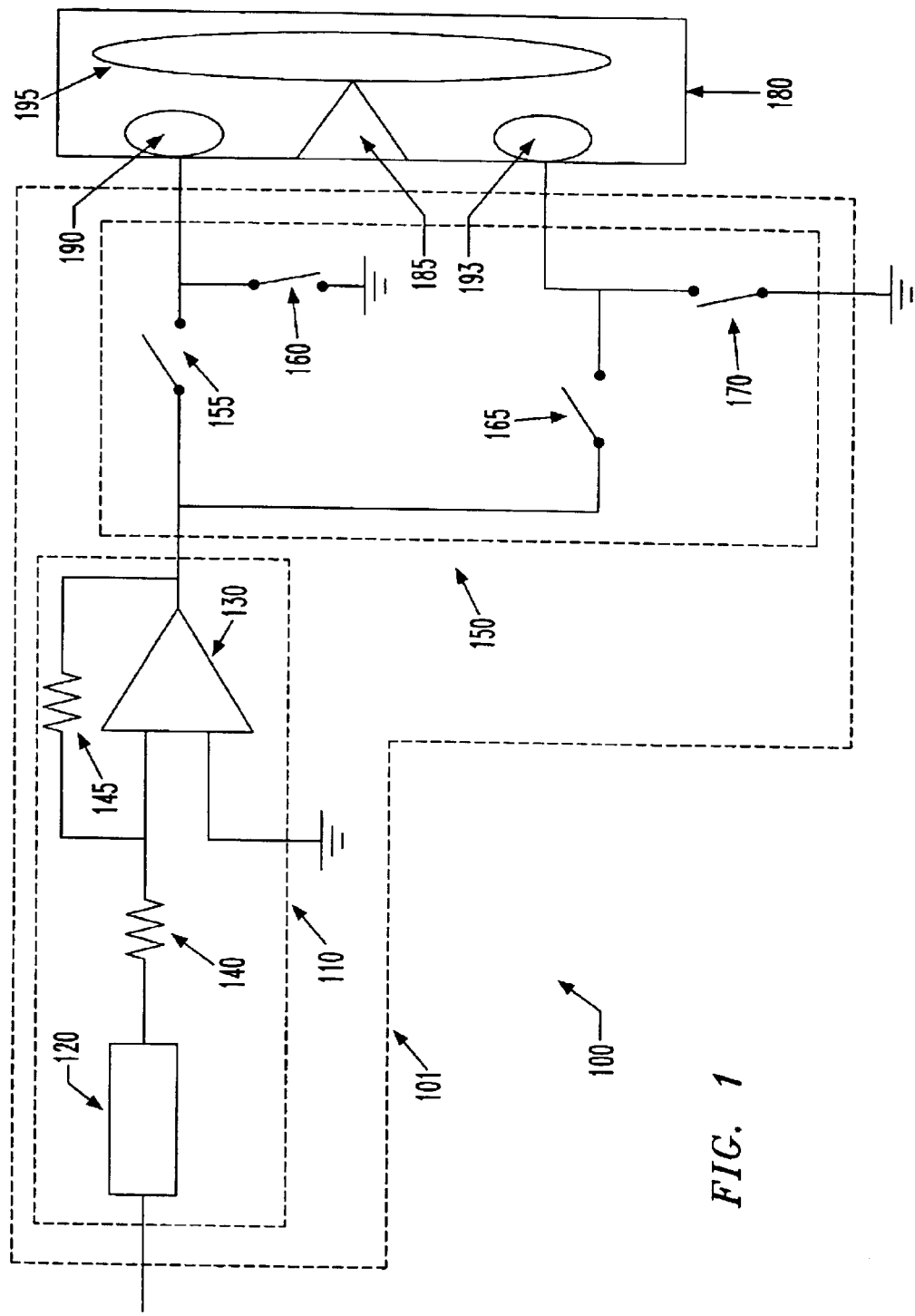
FIG. 1 illustrates one embodiment of a drive circuit and switching network for driving a MEMS device constructed according to the principles of the present invention.

Referring initially to FIG. 1, illustrated is one embodiment of a MEMS driver 100 employing an electrode driver circuit 110 and a switching network 150 for driving a MEMS device 180 constructed according to the principles of the present invention. The electrode driver circuit 110 and the switching network 150 may be embodied in an integrated circuit 101.

The electrode driver circuit 110 has a digital to analog converter (DAC) 120. The DAC 120 converts an inputted value which represents a desired drive voltage to be applied to a first electrode 190 or a second electrode 193 of the MEMS device 180. Employment of the first electrode 190 and the second electrode 193 will be described in more detail, below. The analog output voltage of the DAC 120 is then amplified by the amplifier 130. Perhaps a high-voltage (HV) amplifier 130. Briefly, the amplifier 130 amplifies a voltage output by the DAC 120, perhaps as a function of the resistance of a first resistor 145 divided by a second resistor 140. The amplifier 130 then inputs its voltage signal into the switching network 150. In the illustrated embodiment of the MEMS driver 100, advantageously there is only the single electrode driver circuit 110 and a single switching network 150 for the first electrode 190 and second electrode 193 pair on a given axis.

The switching network 150 employs the single electrode driver circuit 110 to drive the first electrode 190 and the second electrode 193. In the switching network 150, a first switch 155 interposes the output of the electrode driver circuit 110 and the first electrode 190. In the illustrated embodiment, the first switch 155 is open. A second switch is illustrated interposing the first electrode 190 and an electrical ground. In the illustrated embodiment, the second switch 160 is open. A third switch 165 interposes the output of the electrode driver circuit 110 and the second electrode 195. In the illustrated embodiment, the third switch 165 is closed. Finally, a fourth switch 170 interposes the second electrode 193 and the electrical ground. In the illustrated embodiment, the fourth switch 170 is closed.

This set of the first switch 155, the second switch 160, the third switch 165 and the fourth switch 170 is referred to as a first configuration. If all switches were reversed (i.e., all the on switches were turned off and all the off switches were turned on), this set of switch states is referred to as a second configuration. In one embodiment of the present invention, the first and second configurations are mutually exclusive. Alternatively, the first and second configurations may coexist, advantageously, for only a brief period of time.

Finally, the MEMS device 180 has a fulcrum 185, the first electrode 190 and the second electrode 193, and a mirror 195. In either the first or second configuration, one of the pair of the first or second electrodes 190, 193 is driven by a voltage, while the other of the pair of the first or second electrodes 190, 193 is attached to ground. In the opposite configuration, the switches are logically inverted—i.e., on switches become off and off switches become on. In the illustrated embodiment, the second electrode 193 is driven by a drive voltage, and the first electrode 190 is coupled to the electrical ground, by the switching network 150, thereby controlling the MEMS device 180 with only the single electrode driver circuit 110. By applying the drive voltage or ground to the first or second electrodes 190, 193 the mirror 195 can be made to tilt.

Figure 2:
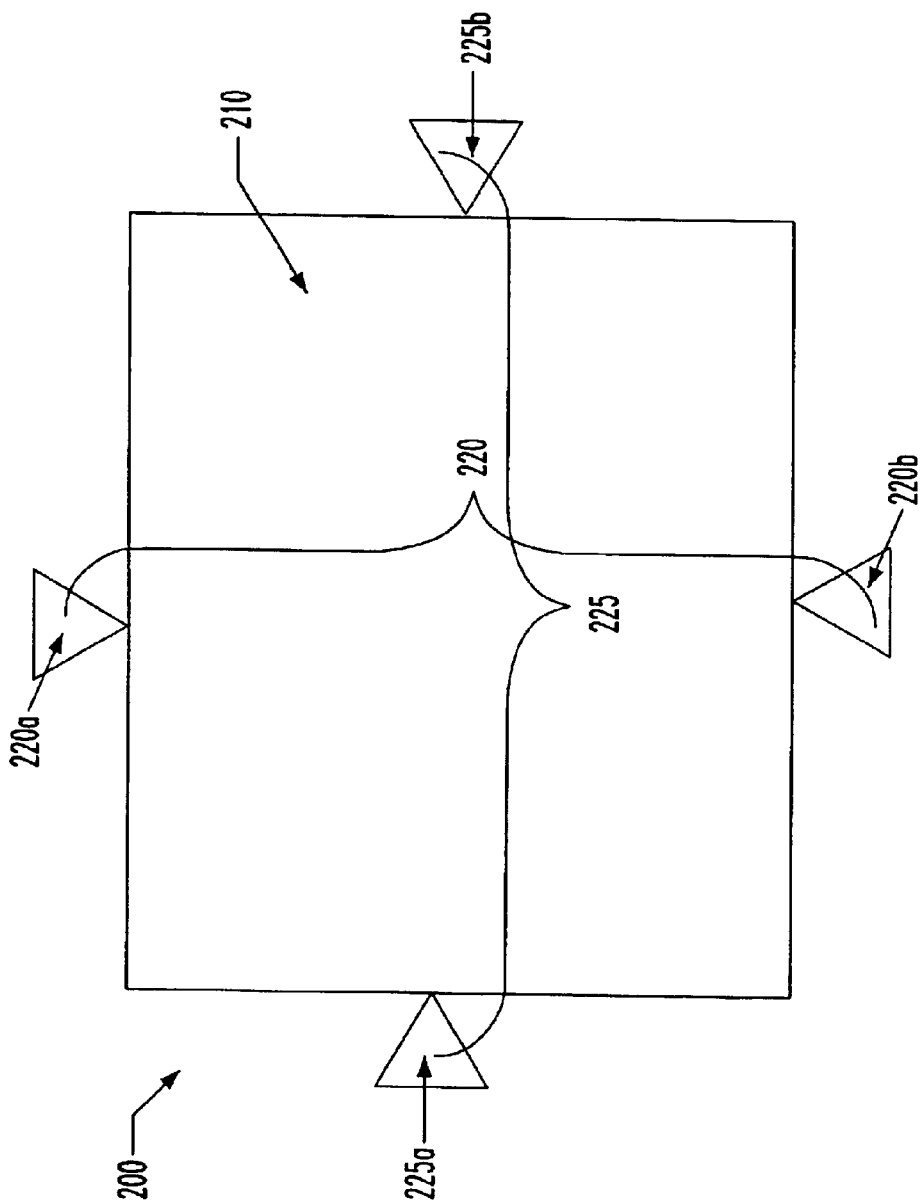
FIG. 2 illustrates one embodiment of a multi-axis MEMS device constructed according to the principles of the present invention.

Turning briefly to FIG. 2, illustrated is one embodiment of a multi-axis MEMS device 200 (MEMS device 200) that is free to be driven and constructed according to the principles of the present invention. The MEMS device 200 has a mirror 210. The MEMS device 200 also has two pairs of drive electrodes. A first drive electrode pair 220 has a first drive electrode 220a and a second drive electrode 220b. A second drive electrode pair 225 has a first drive electrode 225a and a second drive electrode 225b.

The MEMS device 200 may therefore have the first drive electrode pair 220 and the second drive electrode pair 225 may each be set in its own first configuration or second configuration. As each axis of the MEMS device 200 operates independently, any one of the first pair of drive electrodes 220a, 220b may be set to ground and a first drive voltage applied to the other electrode, and any one of the second pair of drive electrodes 225a, 225b may be set to ground and a second drive voltage applied to the other electrode. Therefore, in the illustrated embodiment, there will be a second switching network and a second electrode driver circuit, one for each axis.

Figure 3:
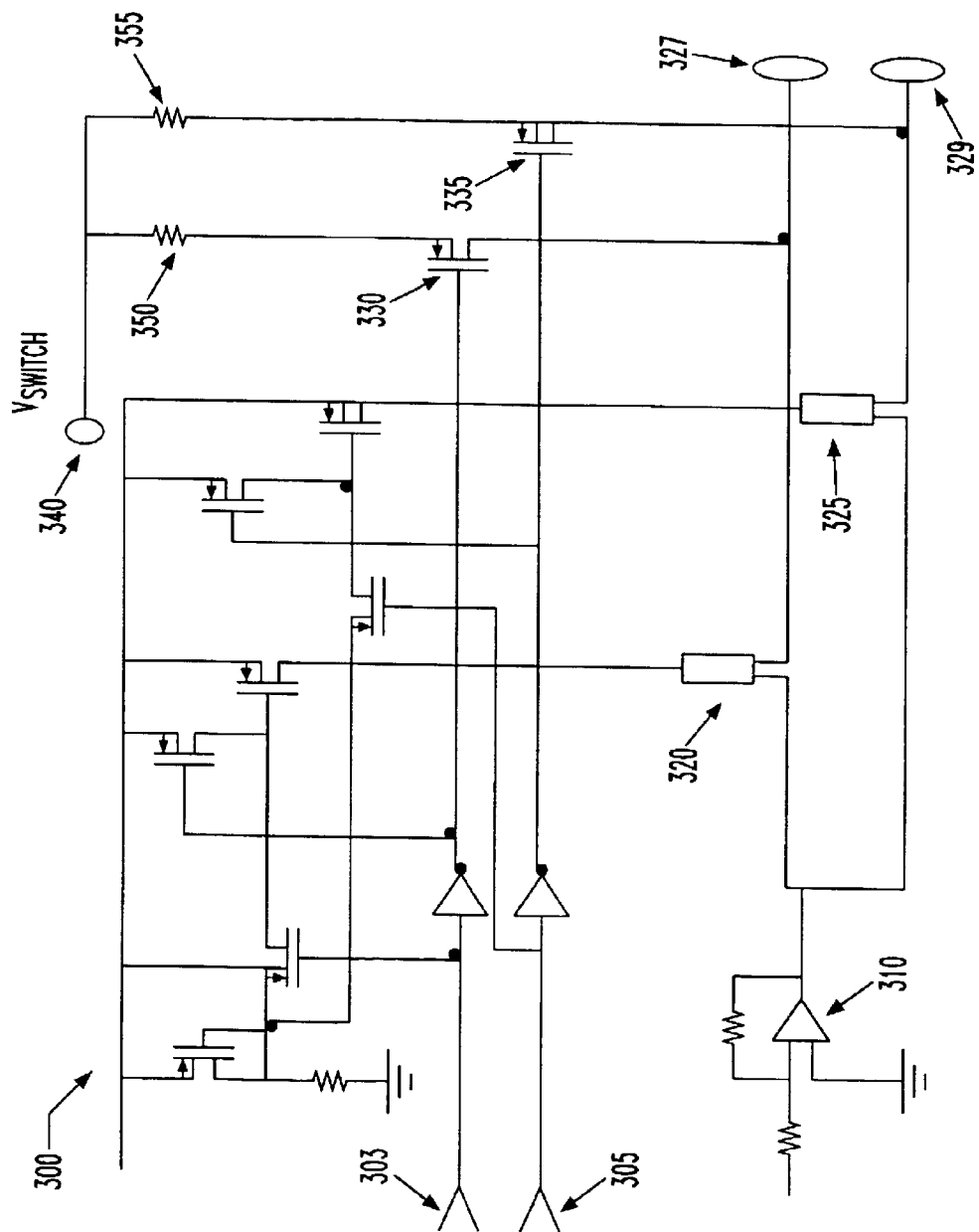
FIG. 3 illustrates one detailed embodiment of a drive circuit and switching network embodied in an integrated circuit constructed according to the principles of the present invention.

Turning now to FIG. 3, illustrated one detailed embodiment of a drive circuit and switching network embodied in an integrated circuit (ic) 300 constructed according to the principles of the present invention. An amplifier 310, perhaps a HV amplifier, may be employed in an inverting configuration to amplify the output of the previous DAC. The amplifier 310 could also be employed in a non-inverting configuration. The output of the amplifier 310 is then input into a first amplifier switch 320 and a second amplifier switch 325.

The first and second amplifier switches 320, 325 allows the voltage driver output of the amplifier 310 to amplify and pass through the driver voltage, while the remaining amplifier switch 320, 325 output voltage is disabled. A control current into the first or second amplifier switch 320, 325 turns the first and second amplifier 320, 325 on or off. The amplified value of the output of the first amplifier switch 320 may then be output to a first electrode 327, or the first electrode 327 may instead be coupled to electrical ground, as to be described in more detail below. Likewise, the amplified value of the output of the second amplifier switch 325 may then be output to a second electrode 329, or the second electrode 329 may instead be coupled to electrical ground, as to be described in more detail below.

Two inputs, a first input 303 and a second input 305, are input into the ic 300 representing a selected member of a pair of drive electrodes (i.e, either the first electrode 327 or the second electrode 329) which is to be enabled or disabled. The first input 303 and the second input 305 should be complementary. A first ground switch 330 may then be closed by the first input 303, or the first ground switch 330 will be open. Likewise, a second ground switch 335 may then be closed by the second input 305, or the second ground switch 335 will be open. Either way, the first and second ground switches 330, 335 should be complements of one another.

In the illustrated embodiment of the MEMS device 300, the first ground switch 330 and the second ground switch 335 are both single P-channel transistors. As is well known to those skilled in the art, when transistors are turned on, they may become a short circuit. In the illustrated embodiment, this means that either the first electrode 327 or the second electrode 329 is electrically coupled to a Vswitch 340. Depending upon the exact system implementation, the Vswitch 340 potential does not need to be exactly 0 Volts. For example, a 5 Volt supply could be used. A first resistor 350 and a second resistor 355 are both employed for current limiting.

Figure 4:
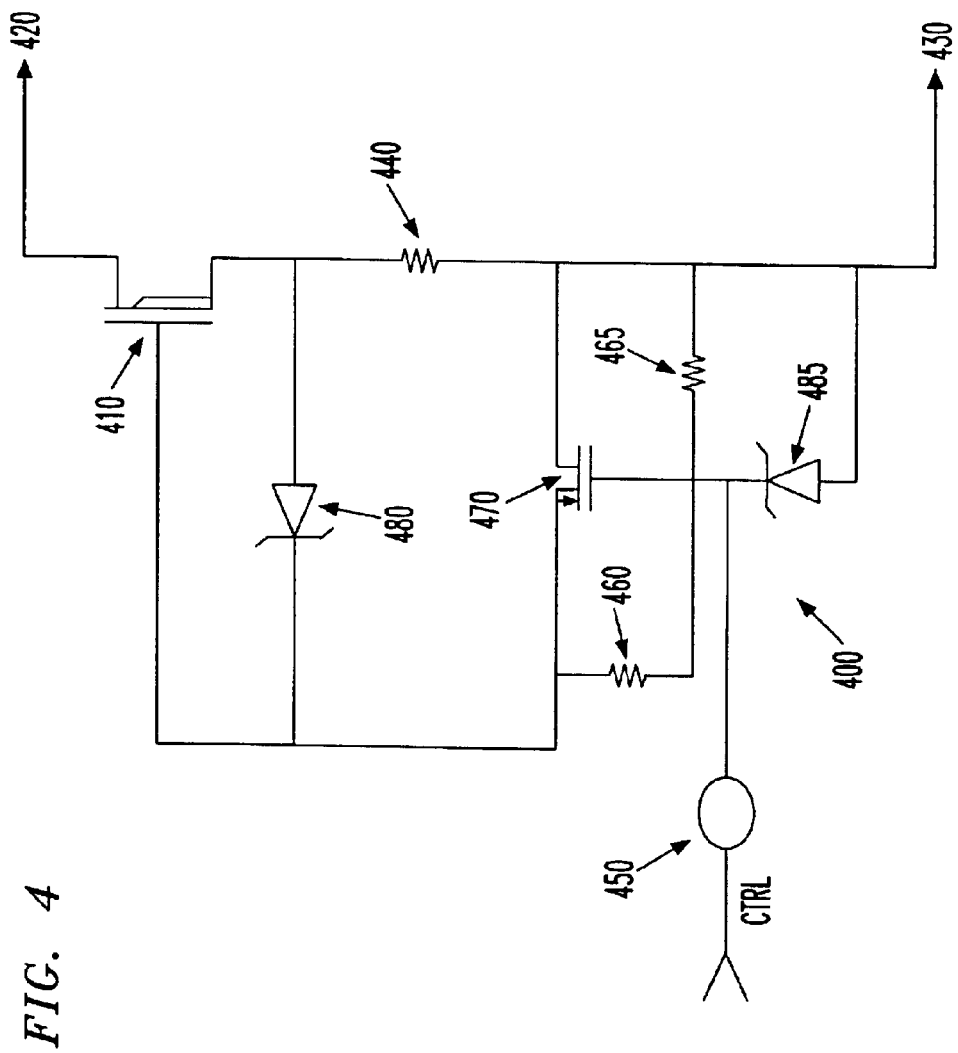
FIG. 4 illustrates one detailed embodiment of an amplifier switch constructed according to the principles of the present invention.

Turning now to FIG. 4, illustrated is one detailed embodiment of an amplifier switch 400 constructed according to the principles of the present invention. In the illustrated embodiment, a single high voltage Nchannel transistor 410 may be used to connect an electrical ground voltage 420 to a drive electrode 430. A current limiting resistor 440 adds current limiting to the amplifier switch 400. A control current into a control current node 450 turns the amplifier switch 400 on. If no current is applied, a first resistor 460, a second resistor 465 and a transistor 470 cooperate to turn the switch off. If a sufficient current is applied, the first resistor 460, the second resistor 465 and the transistor 470 cooperate to turn the switch on. A first zener diode 480 is employed for gate to source protection of the Nchannel transistor 410, and a second zener diode 485 is employed for gate to source protection of the transistor 470.

Although the present invention has been described in detail, those skilled in the art should understand that they can make various changes, substitutions and alterations herein without departing from the spirit and scope of the invention in its broadest form.

What is claimed is:

1. A drive circuit for a MEMS device, comprising:
   an electrode driver; and
   a switching network, coupled to an output of said electrode driver, said switching network comprising a first switch interposing said output and a first electrode of an axis of said MEMS device, a second switch interposing said output and a second electrode of said axis of said MEMS device, a third switch interposing said first electrode and an electrical ground, and a fourth switch interposing said second electrode and said electrical ground, that:
   in a first configuration, couples said output to said first electrode and grounds said second electrode, and
   in a second configuration, couples said output to said second electrode and grounds said first electrode.

2. The drive circuit as recited in claim 1 wherein said electrode driver comprises:
   a digital-to-analog converter; and
   an amplifier that provides said output.

3. The drive circuit as recited in claim 1 wherein said first and second configurations are mutually exclusive.

4. The drive circuit as recited in claim 1 wherein said first and fourth switches operate in tandem, said second and third switches operate in tandem and said first and second switches are never simultaneously in an ON state.

5. The drive circuit as recited in claim 1 further comprising:
   a second electrode driver; and
   a second switching network, coupled to an output of said second electrode driver that:
   in a first configuration, couples said output to a third electrode of a second axis of said MEMS device and grounds an opposing fourth electrode of said second axis of said MEMS device, and
   in a second configuration, couples said output to said fourth electrode and grounds said third electrode.

6. The drive circuit as recited in claim 1 wherein said electrode driver and said switching network are embodied in an integrated circuit.

7. A method of driving a MEMS device, comprising:
   providing a switching network, coupled to an output of an electrode driver, said switching network comprising a first switch interposing said output and a first electrode of an axis of said MEMS device, a second switch interposing said output and a second electrode of said axis of said MEMS device, a third switch interposing said first electrode and an electrical ground, and a fourth switch interposing said second electrode and said electrical ground;
   assuming a first configuration in which said output of said electrode driver is coupled to said first electrode and said second electrode is grounded; and
   assuming a second configuration in which said output is coupled to said second electrode and said first electrode is grounded.

8. The method as recited in claim 7 wherein said electrode driver comprises:
   a digital-to-analog converter; and
   an amplifier that provides said output.

9. The method as recited in claim 7 wherein said first and second configurations are mutually exclusive.

10. The method as recited in claim 8 further comprising:
    operating said first and fourth switches in tandem; and
    operating said second and third switches in tandem, said first and second switches never being simultaneously in an ON state.

11. The method as recited in claim 7 further comprising:
    assuming a first configuration in which an output of a second electrode driver is coupled to a third electrode of a second axis of said MEMS device and an opposing fourth electrode of said second of said MEMS device is grounded; and
    assuming a second configuration in which said output is coupled to said fourth electrode and said third electrode is grounded.

12. The method as recited in claim 7 wherein said steps of assuming are carried out in an integrated circuit.

13. An integrated circuit, comprising:
    a plurality of MEMS devices each having first and second axes of tilt; and
    a corresponding plurality of drive circuits, each comprising:

first and second electrode drivers each comprising a digital-to-analog converter and an amplifier for providing an output, a first switching network, coupled to said output of said first electrode driver that alternatively drives opposing first and second electrodes of a first axis of one of said plurality of MEMS devices, and a second switching network, coupled to an output of said second electrode driver that alternatively drives opposing third and fourth electrodes of a second axis of one of said plurality of MEMS devices.

14. A method of manufacturing an integrated circuit, comprising:

fabricating a plurality of MEMS devices each having first and second axes of tilt; and forming a corresponding plurality of drive circuits, each comprising:

first and second electrode drivers each comprising a digital-to-analog converter and an amplifier for providing an output, a first switching network, coupled to said output of said first electrode driver that alternatively drives opposing first and second electrodes of a first axis of one of said plurality of MEMS devices, and a second switching network, coupled to an output of said second electrode driver that alternatively drives opposing third and fourth electrodes of a second axis of one of said plurality of MEMS devices.

* * * * *